US008467728B2

(12) United States Patent
Kim et al.

(10) Patent No.: US 8,467,728 B2
(45) Date of Patent: Jun. 18, 2013

(54) METHOD OF ALLOCATING RADIO RESOURCES IN MULTI-CARRIER SYSTEM

(75) Inventors: Hak Seong Kim, Seoul (KR); Bong Hoe Kim, Ansan-si (KR); Joon Kui Ahn, Seoul (KR); Dong Youn Seo, Seoul (KR); Jung Hoon Lee, Seoul (KR); Young Woo Yun, Seoul (KR); Suk Hyon Yoon, Seoul (KR); Eun Sun Kim, Seoul (KR); Ki Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 11/671,960

(22) Filed: Feb. 6, 2007

(65) Prior Publication Data

US 2007/0264936 A1     Nov. 15, 2007

(30) Foreign Application Priority Data

Feb. 6, 2006  (KR) .................. 10-2006-0011296

(51) Int. Cl.
*H04B 7/00*     (2006.01)

(52) U.S. Cl.
USPC .......... 455/45; 455/434; 455/446; 455/452.2; 455/517; 455/455; 370/320; 370/329; 370/342; 370/338; 370/395.4

(58) Field of Classification Search
USPC ............. 455/45, 414.1, 434, 446, 422.1, 449, 455/452.2, 517, 455, 522; 370/320, 310, 370/329, 343, 480, 208, 341, 252, 204, 342, 370/338, 395.4
See application file for complete search history.

(56) References Cited

U.S. PATENT DOCUMENTS

| | | | | |
|---|---|---|---|---|
| 6,714,528 B1 * | 3/2004 | Moon et al. | ................... | 370/342 |
| 7,069,009 B2 * | 6/2006 | Li et al. | ......................... | 455/446 |
| 7,158,495 B2 * | 1/2007 | Jei | ................................. | 370/329 |
| 7,212,809 B2 * | 5/2007 | Khawand | ................... | 455/414.1 |
| 7,440,437 B2 * | 10/2008 | Song | ............................. | 370/343 |
| 7,616,603 B2 * | 11/2009 | Anderson et al. | ............. | 370/329 |
| 7,684,762 B2 | 3/2010 | Ihm et al. | | |

(Continued)

FOREIGN PATENT DOCUMENTS

| CN | 1360765 | 7/2002 |
|---|---|---|
| CN | 1698321 | 12/2002 |

(Continued)

OTHER PUBLICATIONS

Panasonic, "Inclusion of additional data on RACH", R1-060161, TSG-RAN WG1 LTE Ad hoc meeting, Jan. 2006.

(Continued)

*Primary Examiner* — April G Gonzales
(74) *Attorney, Agent, or Firm* — Lee, Hong, Degerman, Kang & Waimey

(57) ABSTRACT

A method of allocating radio resources in a multi-carrier system is disclosed, by which a signaling message can be efficiently transmitted according to necessity of a user equipment. In a user equipment of a mobile communication system transceiving data using a plurality of subcarriers, the present invention includes the steps of if the signaling message to be transmitted is generated in the user equipment, generating a preamble sequence according to a user equipment identifier to identify the user equipment, transmitting a preamble signal including the preamble sequence and the signaling message to a base station, and receiving an acknowledgement signal for the preamble signal generated according to the user equipment identifier.

12 Claims, 7 Drawing Sheets

U.S. PATENT DOCUMENTS

| | | | |
|---|---|---|---|
| 7,701,901 B2 * | 4/2010 | Anderson et al. | 370/329 |
| 7,746,840 B2 | 6/2010 | Lee | |
| 7,768,966 B2 * | 8/2010 | Yoon et al. | 370/329 |
| 7,813,291 B2 | 10/2010 | Yoon et al. | |
| 2002/0141359 A1 * | 10/2002 | Jei | 370/329 |
| 2002/0145968 A1 | 10/2002 | Zhang et al. | |
| 2003/0072395 A1 | 4/2003 | Jia et al. | |
| 2004/0127223 A1 * | 7/2004 | Li et al. | 455/446 |
| 2004/0157602 A1 * | 8/2004 | Khawand | 455/434 |
| 2005/0195791 A1 | 9/2005 | Sung et al. | |
| 2005/0289256 A1 | 12/2005 | Cudak et al. | |
| 2006/0251030 A1 * | 11/2006 | Anderson et al. | 370/338 |
| 2006/0251031 A1 * | 11/2006 | Anderson et al. | 370/338 |
| 2007/0133458 A1 | 6/2007 | Chandra et al. | |
| 2007/0155337 A1 | 7/2007 | Park et al. | |
| 2007/0264936 A1 | 11/2007 | Kim et al. | |
| 2008/0045272 A1 | 2/2008 | Wang et al. | |
| 2008/0123585 A1 * | 5/2008 | Granzow et al. | 370/320 |
| 2008/0287138 A1 * | 11/2008 | Yoon et al. | 455/452.2 |
| 2008/0304446 A1 * | 12/2008 | Kimura et al. | 370/329 |
| 2008/0310333 A1 * | 12/2008 | Balachandran et al. | 370/310 |
| 2009/0177937 A1 | 7/2009 | Lee et al. | |

FOREIGN PATENT DOCUMENTS

| | | |
|---|---|---|
| GB | 2415870 | 1/2006 |
| JP | 2000-151549 | 5/2000 |
| JP | 2000-332723 | 11/2000 |
| JP | 2005094750 | 4/2005 |
| KR | 2004-0048675 A | 6/2004 |
| KR | 1020050076560 | 7/2005 |
| KR | 1020050078636 | 8/2005 |
| TW | 2005-37822 | 11/2005 |
| TW | 2005-41240 | 12/2005 |
| WO | WO 2004-100598 A1 | 11/2004 |
| WO | 2005/109690 | 11/2005 |
| WO | 20051109678 | 11/2005 |
| WO | 2005125020 | 12/2005 |

OTHER PUBLICATIONS

Nortel, "Consideration on UL RACH scheme for LTE", R1-060152, 3GPP RAN1 LTE Ad Hoc meeting, Jan. 2006.

RAN2, "LTE L1 related questions to RAN1", R2-060144, 3GPP TSG-RAN2 Meeting #50, Jan. 2006.

QUALCOMM Europe, "Characteristics of UL Access Channel," 3GPP TSG-RAN WG1 LTE Ad Hoc, R1-060181, Jan. 23, 2006.

Ericsson, "Uplink transport channels in LTE", 3GPP TSG RAN WG2#50, R2-060059, Jan. 2006.

3rd Generation Partnership Project, "Technical Specification Group Radio Access Network; Physical Layer Aspects for Evolved UTRA (Release 7)", 3GPP TR 25.814 V1.0.2, Jan. 2006.

LG Electronics, "Uplink resource request for uplink scheduling", 3GPP TSG RAN WG1#44, R1-060536, Feb. 2006.

Taiwan Intellectual Property Office Application Serial No. 096104327, Search Report dated Apr. 24, 2013, 13 pages.

* cited by examiner

METHOD OF ALLOCATING RADIO RESOURCES IN MULTI-CARRIER SYSTEM

This application claims the benefit of the Korean Patent Application No. P2006-11296, filed on Feb. 6, 2006, which is hereby incorporated by reference as if fully set forth herein.

BACKGROUND OF THE INVENTION

1. Field of the Invention

The present invention relates to a method of allocating radio resources in a multi-carrier system, and more particularly, to a method of transmitting a signaling message from a user equipment communicating with a multi-carrier system. Although the present invention is suitable for a wide scope of applications, it is particularly suitable for an OFDM communication system, a DFT-S-OFDM communication system, an OFDMA communication system or a communication system of transmitting data carried by a plurality of subcarriers to maintain orthogonality between a plurality of the subcarriers.

2. Discussion of the Related Art

Generally, OFDM, DFT-S-OFDM (DFT spreading OFDM) and OFDMA systems are used as communication methods in multi-carrier systems, which is explained as follows.

In the following description, OFDM (orthogonal frequency division multiplexing) is explained. A basic principle of OFDM lies in dividing a high-rate data stream into a number of slow-rate data streams and transmitting the slow-rate data streams simultaneously using a plurality of carriers. In this case, each of a plurality of the carriers is called a subcarrier. Since orthogonality exists between a plurality of the carriers of OFDM, even if frequency components of the carriers are mutually overlapped, they can be detected by a receiving end. The high-rate data stream is converted to a plurality of slow-rate data streams by a serial-to-parallel converter, a plurality of the parallel-converted data streams are multiplied by subcarriers, respectively, the multiplied data streams are summed up together, and the corresponding sum is then transmitted to the receiving terminal.

A plurality of the parallel-converted data streams can be transmitted as a plurality of subcarriers by IDFT (Inverse Discrete Fourier Transform). And, the IDFT can be efficiently implemented using IFFT (Inverse Fast Fourier Transform).

As a symbol duration of a subcarrier having a low data rate increases, relative signal dispersion occurring by multi-path delay spreading decreases. And, it is able to reduce inter-symbol interference by inserting a guard interval, which is longer than delay spreading of channel, between OFDM symbols. Moreover, a portion of an OFDM signal is copied and placed at a start portion of symbols in a guard interval. If so, OFDM symbols are cyclically extends to be protected.

DFT-S-OFDM according to a related art is explained as follows.

First of all, the DFT-S-OFDM is called SC-FDMA (Single Carrier-FDMA) as well. The SC-FDMA is the scheme mainly applicable to uplink. In the SC-FDMA, a spreading scheme is first applied in a frequency domain by DFT matrix before generating an OFDM signal, the corresponding result is modulated by the OFDM scheme, and the modulated result is then transmitted.

FIG. 1 shows a configuration of a transmitting end according to DFT-S-OFDM. To explain operations of the related art device, several variables are defined. 'N' indicates a number of subcarriers carrying OFDM signal, 'Nb' indicates a number of subcarriers for a random user, 'F' indicates Discrete Fourier Transform matrix, i.e., DFT matrix, 's' indicates a data symbol vector, 'x' indicates a spread vector in frequency domain, and 'y' indicates a transmitted OFDM symbol vector in time domain.

In SC-FDMA, data symbol (s) is spread using DFT matrix before being transmitted. This is represented as Formula 1.

$$x = F_{N_b \times N_b} s \quad \text{[Formula 1]}$$

In Formula 1, $F_{N_b \times N_b}$ is an $N_b$-sized DFT matrix used to spread data symbol (s). Subcarrier mapping is performed on the spread vector (x) by a predetermined subcarrier assigning scheme and a signal to be transmitted to a receiving end is obtained from transforming the corresponding result into a time domain by IDFT module. A signal transmitted to the receiving end is represented as Formula 2.

$$y = F_{N \times N}^{-1} x \quad \text{[Formula 2]}$$

In Formula 2, $F_{N \times N}^{-1}$ is an N-sized DFT matrix used to convert a frequency-domain signal to a time-domain signal. A cyclic prefix is inserted in a signal 'y' generated by the above method to be transmitted. And, a method of generating a transmission signal and transmitting the signal to a transmitting terminal in the above manner is called SC-FDMA. And, it is able to control a size of DFT matrix in various ways for specific purposes. For instance, if the size of the DFT matrix is equal to the number of points of IDFT, it is able to reduce PAPR in a transmitting terminal.

OFDMA (Orthogonal Frequency Division Multiple Access) according to a related art is explained as follows.

First of all, OFDMA is a multiple access method for implementing a multiple access in a modulating system using a plurality of orthogonal subcarriers in a manner of providing each user with available subcarriers. In the OFDMA, frequency resources called subcarriers are provided to a plurality of users, respectively. In general, the frequency resources are independently provided to a plurality of the users, respectively not to be overlapped with each other.

A control signal transmitting method in LTE (Long Term Evolution) system is explained as follows.

First of all, unlike the uplink of the conventional CDMA communication system, an uplink of the LTE system uses an access method using a plurality of subcarriers having orthogonality.

In case of a system supporting a circuit type service, if there exists data to be transmitted to the LTE system, a user equipment (UE) makes a request for a call setup to a Node B. If the call setup is achieved by the Node B, the user equipment keeps transmitting the data. Even if there exists no data to be transmitted in this system, the call keeps being maintained. After the call maintained status has passed by, the call is disconnected. For this reason, in case of a service that mainly uses packet type data, system efficiency gets degraded.

So, in case of a system that mainly provides a packet data service, the service is provided using a shared channel shared by all user equipments to enhance system efficiency. In particular, in an orthogonal frequency division access system that transmits packets via the shared channel, orthogonality between data channels transmitted in uplink should be maintained. Through this, transmission efficiency of the system can be raised.

Explained in the following description is a method of transmitting data via the shared channel.

A general scheduled transmission mode is explained.

First of all, a Node B performs scheduling and designates a UE to transmit data according to a result of the scheduling. According to the scheduling result, the Node B exclusively allocates resources in frequency and time domains to be used by the user equipment and then informs the user equipment of the allocated resources. So, it is able to previously prevent collisions between a plurality of user equipments in data transmission. In other words, uplink resources managed by the Node B are shared by a plurality of the user equipments. The scheduling for allocating the uplink shared channel to a plurality of the user equipments under the supervision of the Node B so that the corresponding user equipment transmits data to the Node B. This transmission mode is defined as a scheduled transmission mode.

The scheduled transmission mode is also characterized in that a scheme for maintaining synchronization between user equipments transmitting data in uplink should be used. In particular, in order to maintain orthogonality between signals transmitted from a plurality of user equipments in uplink, signals transmitted from a plurality of the user equipments should be received by the Node B at the same time with error ranging within a cyclic prefix of OFDM.

For this, the Node B should adjust a transmission timing point of each of the user equipments by calculating time information for the signal of each of the user equipments and setting the timing point ahead or behind.

A contention based transmission mode is explained as follows.

First of all, the contention based transmission mode is preferably used for a case that the Node B is unable to designate a user equipment by performing the scheduling in advance or a case that a user equipment should male a transmission arbitrarily without a permission of base station to minimize the time delay attributed to the scheduling.

There should be a clear discrimination between the contention based transmission mode and the scheduled transmission mode in a time or frequency domain.

FIG. 2A to FIG. 2C show methods of discriminating the contention based transmission mode and the scheduled transmission mode from each other. FIG. 2A shows a method of discrimination in a time domain. FIG. 2B shows a method of discrimination in a frequency domain. And, FIG. 2C shows a discriminating method by combination between the time domain discrimination and the frequency domain discrimination.

Consequently, resources transmitted by the scheduled transmission mode or the contention based transmission mode are discriminated based on a specific time domain, a specific frequency domain, or a combination of the specific time and frequency domains.

For a specific frequency-time domain to which the contention based transmission mode is applied, a plurality of the user equipments are free to transmit specific data. Yet, since resource scheduling of the Node B is not carried out in the frequency-time domain, it may happen that a plurality of user equipments may use the same resource at the same time. If a plurality of the user equipments use the same resource simultaneously, the Node B has a problem in recovering all information received from a plurality of the user equipments. In this case, the Node B is able to recover the information transmitted from the user equipment corresponding to a signal having a biggest reception power.

The Node B transmits a acknowledgement signal to the user equipment having transmitted a message detected by the Node B. In this case, the UE failing to receive the acknowledgement (ACK) may attempt a message transmission again via the frequency-time domain for performing the contention based transmission after a specific time has passed by. In particular, a basic operation of the contention based transmission is carried out in a manner of sending a signal to the Node B, waiting for the ACK, and attempting a retransmission in case of failing to receive the AC.

A representative example of the contention based transmission is the data transmission using RACH (Random Access Channel). The transmission system via the RACH is explained as follows.

First of all, a user equipment (UE) obtains timing information of downlink and receives system information transmitted via downlink. In this case, the system information is broadcasted in general. The user equipment obtains information for a time interval and frequency domain available for a contention based transmission via the broadcasted signal. Yet, the Node B is unable to know the presence of the user equipment. So, the user equipment applies a specific code to a specific sequence called a preamble and then transmits the preamble to the Node B to inform of the presence of the corresponding user equipment.

Subsequently, the Node B detects the preamble and then transmits ACK (acknowledgement) to the user equipment using a specific code assigned to the code applied to the preamble.

Through the above process, the data transmission via RACH is executed. The preamble may include other informations (e.g., resource allocation request UE ID, etc.) except the preamble sequence including the specific code. Moreover, it is able to transmit the preamble and the information for temporary UE ID) or the like via the RACH.

Yet, the above-explained preamble transmission via the RACH has a danger of data collision as well as a danger attributed to the contention. The data collision according to the data transmission via the RACH is explained as follows.

First of all, if a plurality of user equipments attempt accesses to a Node B suing the same preamble code at the same time, the collision may take place. The Node B is capable of detecting an access attempt transmitted from one of a plurality of the user equipments only and transmitting ACK (acknowledgement) in response to the access attempt. Yet, in viewpoint of the user equipment, the corresponding user equipment regards the ACK as transmitted to itself, whereby the collision takes place. So, a collision detection process for preventing the collision should be executed in a physical or upper layer.

In the contention based transmission mode, a transmission may be basically carried out while reception synchronization occurs between a plurality of user equipments. And, it is also possible to assume the other case that the synchronized transmission does not occur. In particular, in case that a signal transmitted in a contention based transmission mode is a signal transmitted via RACH, the synchronization between the user equipment and the Node B is not completed yet. So, since a transmission timing point of the user equipment is calculated from a downlink frame time, it is unable to guarantee the synchronization when the Node receives the signal. Yet, after an initial transmission on RACH, it can be assumed that the reception synchronization between the user equipments is completed in a contention based transmission mode used after the beginning of a timing control for each of the user equipments.

In the conventional W-CDMA or CDMA system, an orthogonal code channel dedicated to a signaling message necessary to be transmitted to a Node B from a user equipment exists. If a traffic channel is not established yet since a traffic does not exist between a user equipment and a Node B for a considerable time, a different transmission channel should be used to send an urgent or normal signaling message to the Node B from the user equipment instead of using in-band type signaling via the traffic channel. So, there exists a dedicated orthogonal channel exists to be used for this purpose. A representative example of this kind of signaling message is a request message. In particular, the request message is needed to notify the Node B that a traffic channel needs to be urgently scheduled since a size of transmitting buffer of the user equipment exceeds a specific level under the circumstance that there exist data to be transmitted by the user equipment.

As mentioned in the foregoing description, the uplink transmission modes of the LTE include the scheduled transmission mode and the contention based transmission mode. Due to the characteristics of the orthogonal multiplexing transmission, it is difficult to assign a dedicated channel to transmit a signaling message for user equipments in idle mode. In particular, if a dedicated channel for a transmission of a signaling message is assigned to all user equipments in idle mode, uplink resources are excessively wasted.

SUMMARY OF THE INVENTION

Accordingly, the present invention is directed to a method of allocating radio resources in a multi-carrier system that substantially obviates one or more problems due to limitations and disadvantages of the related art.

An object of the present invention is to provide a method of allocating radio resources in a multi-carrier system, by which a signaling message can be efficiently transmitted according to necessity of a user equipment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a user equipment of a mobile communication system transceiving data using a plurality of subcarriers, a method of exchanging a signaling message in a multi-carrier system according to the present invention includes the steps of if the signaling message to be transmitted is generated in the user equipment, generating a preamble sequence according to a user equipment identifier to identify the user equipment, transmitting a preamble signal including the preamble sequence and the signaling message to a base station, and receiving an acknowledgement signal for the preamble signal generated according to the user equipment identifier.

In another aspect of the present invention, in a user equipment of a mobile communication system transceiving data using a plurality of subcarriers, a method of exchanging a signaling message in a multi-carrier system includes the steps of if the signaling message to be transmitted is generated in the user equipment, generating a preamble sequence according to a user equipment identifier to identify the user equipment, transmitting a preamble signal including the preamble sequence to a base station, receiving an acknowledgement signal for the preamble signal generated according to the user equipment identifier, and transmitting the signaling message according to a result of a detection for the user equipment of the acknowledgement signal.

In another aspect of the present invention, in a user equipment of a mobile communication system transceiving data using a plurality of subcarriers, a method of exchanging a signaling message in a multi-carrier system includes the steps of transmitting information for a presence or non-presence of the signaling message to be transmitted by the user equipment to a base station via a specific first physical channel, receiving a response message including resource allocation information for a transmission of the signaling message, and transmitting the signaling message according to the resource allocation information.

In another aspect of the present invention, in a mobile communication system transceiving data with at least one user equipment using a plurality of subcarriers, a method of exchanging a signaling message in a multi-carrier system includes the steps of receiving a preamble signal including a preamble sequence generated according to a user equipment identifier identifying the user equipment and the signaling message, obtaining the user equipment identifier of the received preamble signal, generating an acknowledgement signal according to the obtained user equipment identifier to include response information for the signaling message, and transmitting the acknowledgement signal to the user equipment.

In another aspect of the present invention, in a mobile communication system transceiving data with at least one user equipment using a plurality of subcarriers, a method of exchanging a signaling message in a multi-carrier system includes the steps of receiving a preamble signal including a preamble sequence generated according to a user equipment identifier identifying the user equipment, obtaining the user equipment identifier of the received preamble signal, generating an acknowledgement signal according to the obtained user equipment identifier to include control information for the signaling message transmitted by the user equipment, and transmitting the acknowledgement signal to the user equipment.

In a further aspect of the present invention, in a mobile communication system transceiving data with at least one user equipment using a plurality of subcarriers, a method of exchanging a signaling message in a multi-carrier system includes the steps of receiving information for a presence or non-presence of the signaling message to be transmitted by the user equipment via a specific first physical channel, transmitting a response message including resource allocation information for a transmission of the signaling message to the user equipment, and receiving the signaling message transmitted according to the resource allocation information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
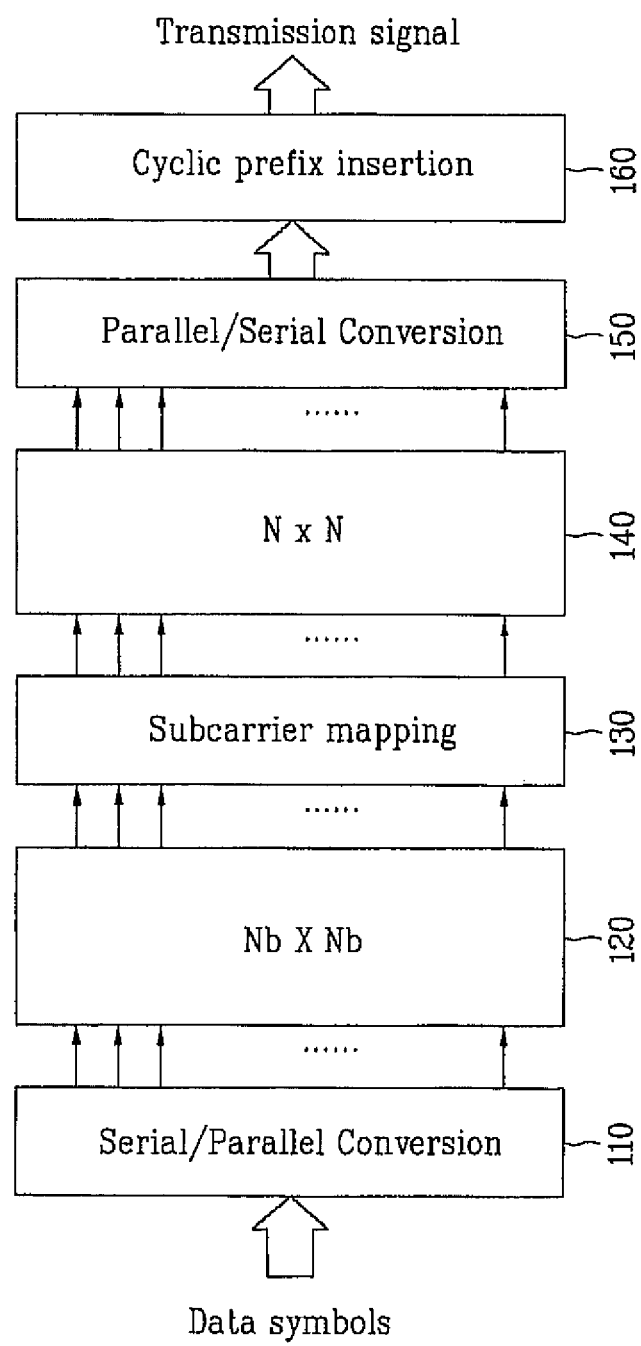
FIG. 1 is a block diagram to explain a method of discriminating a contention based transmission mode and a scheduled transmission mode from each other.
Figure 2A:
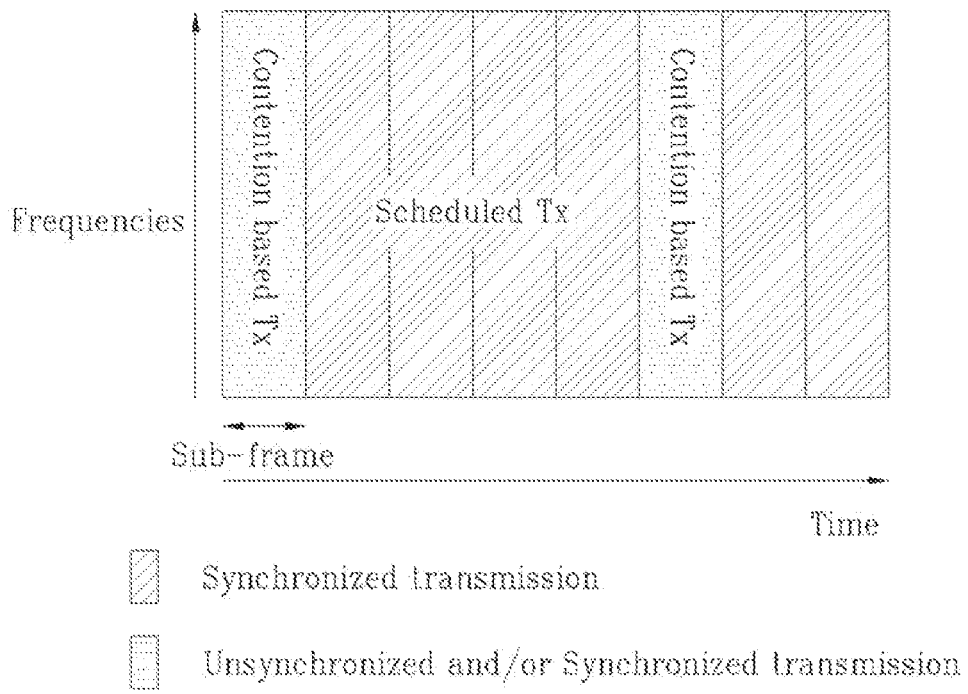
FIGS. 2A to FIG. 2C are diagrams for methods of discriminating a contention based transmission mode and a scheduled transmission mode.
Figure 2B:
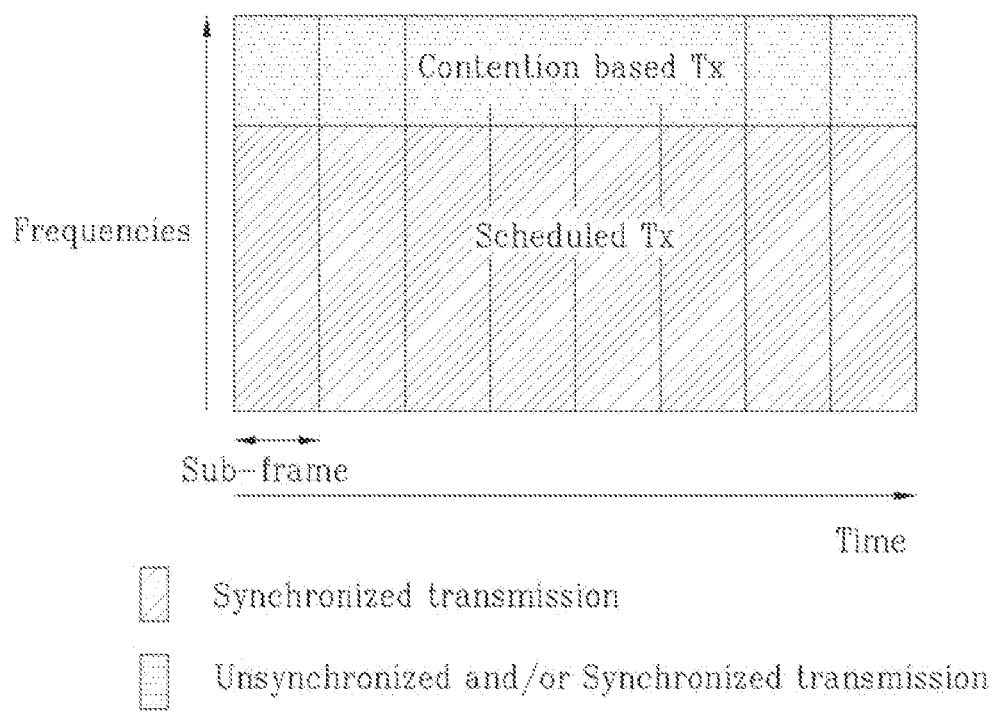
Figure 2C:
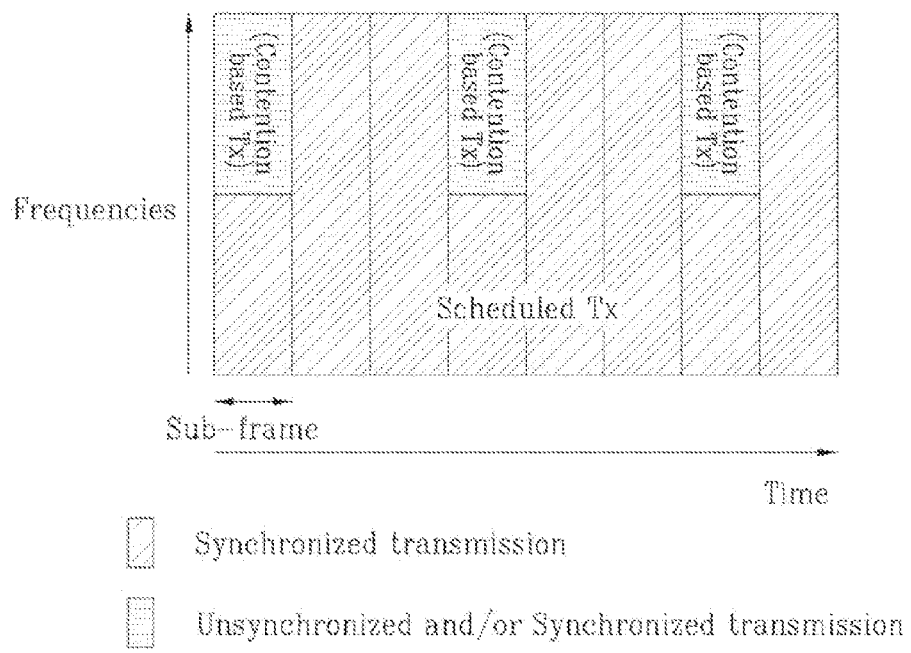

Reference will now be made in detail to the preferred embodiments of the present invention, examples of which are illustrated in the accompanying drawings. Wherever possible, the same reference numbers will be used throughout the drawings to refer to the same or like parts.

One Embodiment of the Present Invention

The present invention transmits data using a plurality of subcarriers. In particular, data is transmitted using subcarriers maintaining orthogonality among a plurality of the subcarriers. So, the present invention can be executed by such a communication system as OFDM, OFDMA, SC-FDMA and the like.

The present invention proposes a method of transmitting a control message, i.e., a message about signaling. One embodiment of the present invention enables two kinds of signaling transmission methods.

A first method is to transmit the signaling message by improving the related art contention based transmission. And, a second method is to transmit the signaling message by improving the related art scheduled transmission.

First Embodiment

A method of transmitting a signaling message by improving the related art contention based transmission is explained as follows.

A first embodiment of the present invention relates to a communication method in a state that a specific traffic channel is established and a state that a specific UE identifier (ID) is given to a user equipment, not in a state that an access to a Node B is attempted in an early stage of communications.

The UE identifier is an identifier used to identify the corresponding user equipment. The UE identifier can be used in a manner of being discriminated into a temporary UE identifier and a regular UE identifier. Namely, the UE identifier includes the temporary UE identifier and the regular UE identifier.

The temporary UE identifier is an identifier temporarily used in an early stage of communications. Yet, the regular UE identifier can be an identifier capable of discriminating a specific user equipment from the rest of user equipments clearly.

The first embodiment of the present invention relates to a communication method in a state that the regular UE identifier is given. Since the regular UE identifier is the information for discriminating a specific user equipment from the rest of user equipments, various kinds of information can be used as the UE identifier.

For instance, a series of identification number given to a user equipment itself such as ESN (electronic serial number) can become the UE identifier. For another instance, an identification number given by one Node B can be used as the UE identifier. In this case, different UE identifiers are given to a plurality of user equipments located within a coverage of one Node B, respectively.

In case of using an identification number given by a Node B as the UE identifier, the UE identifier can be updated if a handover takes place between Node Bs. In particular, a Node B newly initiating communications is able to give a new LE identifier.

For another instance, an identification number given by a Node B group including a plurality of Node Bs can be used as the UE identifier. In particular, an identification number given by a plurality of Node Bs controller by a specific RNC (radio network controller) can be used as the UE identifier. In this case, a new UE identifier can be given in case that a handover takes place between the radio network controllers.

In the first embodiment of the present invention, a user equipment generates a preamble sequence according to the UE identifier. In particular, a user equipment attempting to transmit a random signaling message for specific necessity generates a preamble sequence according to the UE identifier given to the corresponding user equipment.

The UE identifier is an identifier clearly identifying a specific user equipment from another user equipment. So, the user equipment generates the preamble sequence according to the UE identifier given to itself and then transmits the generated preamble sequence to the Node B. If receiving ACK (acknowledgement) from the Node B, the user equipment is able to know whether the ACK is for the preamble transmitted by the user equipment itself.

Hence, it is advantageous in that the possibility of the collision between the user equipments for the Node B is removed.

In case of transmitting a preamble to a Node B using a UE identifier according to the first embodiment of the present invention, a user equipment is able to transmit a signaling message by one of two schemes.

In the first scheme, the user equipment transmits both of the preamble and the signaling message. In particular, the user equipment, which needs to transmit the signaling message if necessary, transmits both of the preamble and the signaling message. For instance, the preamble can be included in a first OFDM symbol of a specific OFDM subframe. The signaling message can be included in an OFDM symbol behind the first OFDM symbol and is then transmitted. In this case, the Node B acquires a UE identifier (ID) for the user equipment through the preamble and is able to receive the signaling message transmitted together with the preamble. Namely, the signaling message is transmitted from the Node B without scheduling. And, the signaling message is transmitted regardless of a presence or non-presence of a reception of an ACK signal from the Node B.

In the second scheme, after having transmitted the preamble, the user equipment receives scheduling information transmitted together with an ACK message for the preamble and then transmits the signaling message according to the received scheduling information. In particular, the user equipment attempting to transmit the signaling message generates a preamble sequence according to the given UE identifier and then transmits the generated preamble sequence to the Node B. Meanwhile, the Node B receives the preamble and then transmits the ACK signal for the received preamble. As the Node B is able to acquire the UE identifier through the preamble, information for a specific UE identifier is included in the ACK signal. And, the Node B is able to transmit allocation information for frequency-time resources for the signaling message together with the ACK signal. Namely, the Node B is able to know that the user equipment attempts to transmit a specific signaling message in a manner of receiving the preamble. So, by the scheduled transmission, the Node B is able to allocate the uplink frequency-time resources for the signaling message and transmit the allocation information to the user equipment together with the ACK signal.

In case of transmitting the signaling message by the method according to the first embodiment of the present invention, it is advantageous that the data collision problem can be solved.

Second Embodiment

Explained in the following description is a method of transmitting a signaling message by improving the related art scheduled transmission.

Although the method according to the first embodiment of the present invention is advantageous in solving the data collision problem, it causes the following problems.

First of all, in case that there exist a plurality of user equipments attempting transmissions using the same uplink resource, the collision between a plurality of the user equipments is inevitable. In case the collision takes place, a Node B is able to detect the user equipment having a biggest reception power only among a plurality of the user equipments. The Node B transmits ACK (acknowledgement) corresponding to a UE identifier assigned to a preamble transmitted from the detected user equipment. Meanwhile, the user equipments wait for the ACK signal from the Node B. If failing to detect the ACK, the waiting user equipment decides that collision has taken place. Having decided that the collision has taken place, the user equipment regenerates a preamble sequence and then transmits the regenerated preamble sequence. Since the first embodiment improves to use the contention based transmission, it is unable to guarantee a fixed time delay to all user equipments. In particular, a user equipment in a bad communication environment or an unlucky user equipment shall have no chance to transmit the signaling message. In worst case of scenario, an overflow may occur in a buffer of the corresponding user equipment.

So, the present invention proposes a second embodiment to improve the first embodiment.

The second embodiment of the present invention proposes a method that a user equipment notifies that there currently exists a signaling message to be sent via a specific physical channel. In particular, the second embodiment is able to use a method of notifying that there currently exists a signaling message to be sent in a manner of adding an n-bit signal field to a specific physical layer channel to be continuously transmitted to a Node B from a user equipment. Alternatively, the second embodiment of the present invention is able to use a method of notifying that there currently exists a signaling message to be sent using a characteristic of a specific physical layer channel.

As mentioned in the foregoing description, in the second embodiment of the present invention, an n-bit signal filed is added to a specific physical channel. No limitation is put on a type of the specific physical channel. In particular, the physical channel is maintained regardless of a presence or non-presence of traffic if a call setup is carried out. Uplink CQICH (channel quality indicator channel) can be used as an example of the physical channel. The Uplink CQICH is a channel periodically transmitted in uplink on a physical layer if there exists no data transmitted in downlink for the scheduling of a downlink shared channel of Node B.

Namely, it is able to notify the presence of signaling to be transmitted by the user equipment in a manner of setting an additional signal field in the CQICH and using the signal field.

A detailed example is explained as follows.

First of all, a size of the n-bit is not limited. Yet a smaller size is advantageous in using radio resources efficiently. Preferably, by setting 'n' to 1, a 1-bit additional signal field is used. In particular, using a flag, it is able to notify the presence of a signaling message a user equipment attempts to transmit.

If there exists a signaling message to be transmitted, the user equipment set up the flag according to a preset agreement. Namely, a presence or non-presence of the signaling message to be transmitted by the user equipment is determined according to a value of the flag. So, the user equipment transmits the flag signal via a specific physical channel. If so, the Node B confirms whether the signaling message to be transmitted by the user equipment exists or not via the flag. The Node B carries out the corresponding scheduling. The Node B then transmits a result of the scheduling to the user equipment in a manner of having a specific UE identifier included in the result.

In the second embodiment, it is able to notify the presence of the signaling to be transmitted by the user equipment using the characteristics of the specific physical channel.

If the specific physical channel is a channel to which modulation according to a non-coherent detection is applied, a polarity of a signal transmitted on the specific physical channel will be constant. In this case, even if an overall polarity is collectively changed, a normal detection in a receiving end is possible since the polarity of the original signal is fixed.

So, in the present embodiment, according to a presence or non-presence of the signaling message to be transmitted, the polarity of the signal transmitted on the specific physical channel is changed and the signal is then transmitted. For instance, if the signaling message exists, a signal having a negative polarity can be transmitted. If the signaling message does not exist, a signal having a positive polarity can be transmitted.

In case of the Uplink CQICH, the modulation according to the non-coherent detection is applicable to the Uplink CQICH. It is able to notify a presence or non-presence of signaling in a manner of changing the polarity. In particular, by obtaining a polarity of a signal received on the specific physical channel, the Node B knows the presence or non-presence of the signaling message the UE attempts to transmit.

If the signaling message exists, the Node B performs scheduling to allocate uplink radio resources for the signaling message. The user equipment then transmits the signaling message through the allocated resources.

The second embodiment of the present invention is more advantageous than the first embodiment in that the presence of the signaling message to be transmitted by the user equipment itself can be quickly notified to the Node B in a manner of using a physical layer bit of 1-bit level only or changing the signal polarity.

Details of the first and second embodiments applied to the request message transmission are explained as follows.

First of all, in the signaling messages transmitted in uplink to Node B from a user equipment in an idle mode according to the first or second embodiment of the present invention, a most important message is the request message. In case that the user equipment has data to be transmitted in uplink, the request message is a message to make a request for a radio resource allocation for the data to be transmitted. And, the request message contains a buffer status of the user equipment, a margin for a transmission power currently transmitted by the user equipment, a type of a service to be transmitted by the user equipment, etc. The Node B then allocates resources for the packet data transmission in uplink to the user equipment.

A method of transmitting a signaling message according to one preferred embodiment of the present invention is explained with reference to FIGS. 3A to 3C as follows.

Figure 3A:
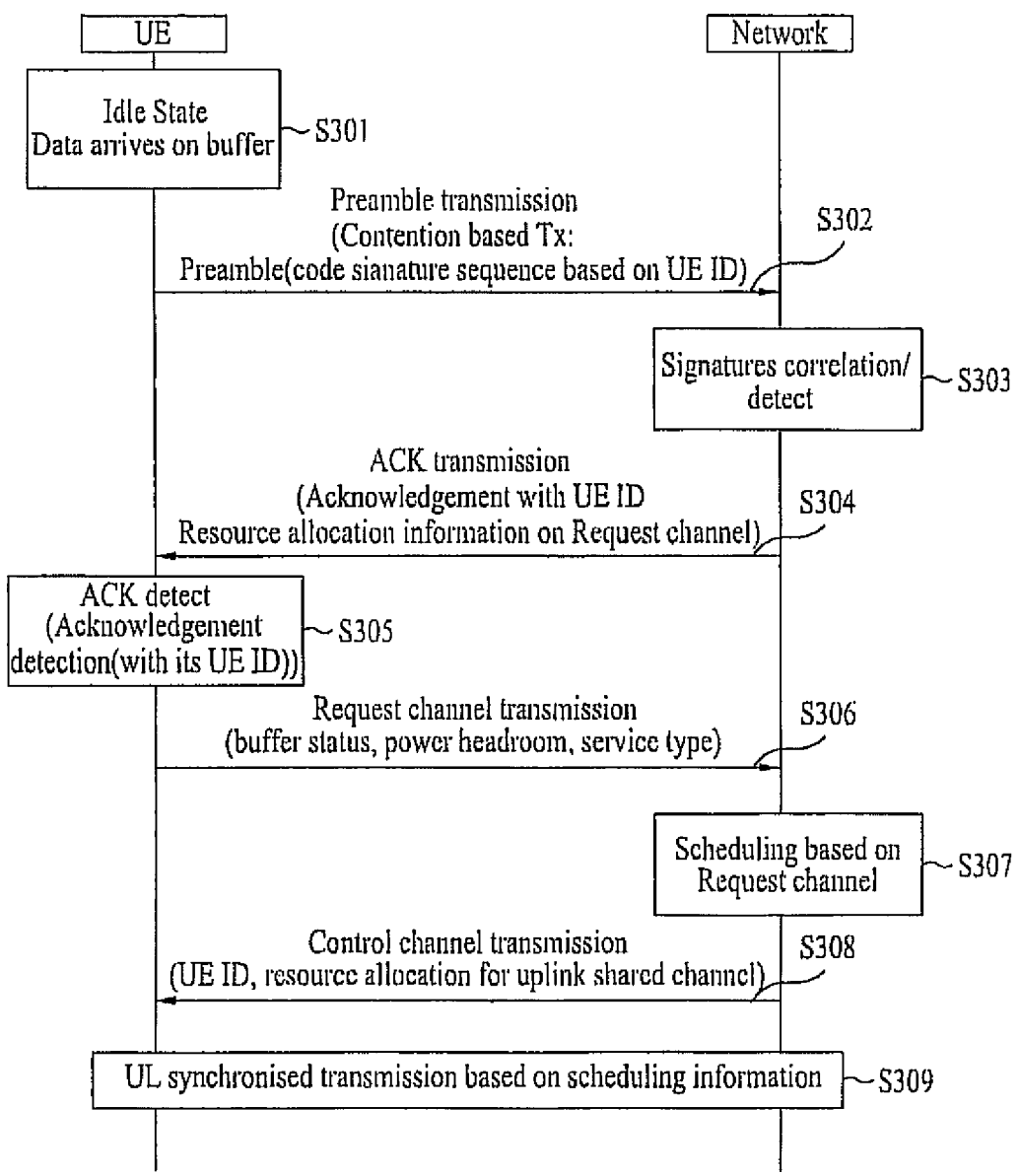
FIG. 3 is a flowchart of a method of transmitting a signaling message according to one embodiment of the present invention.
Figure 3B:
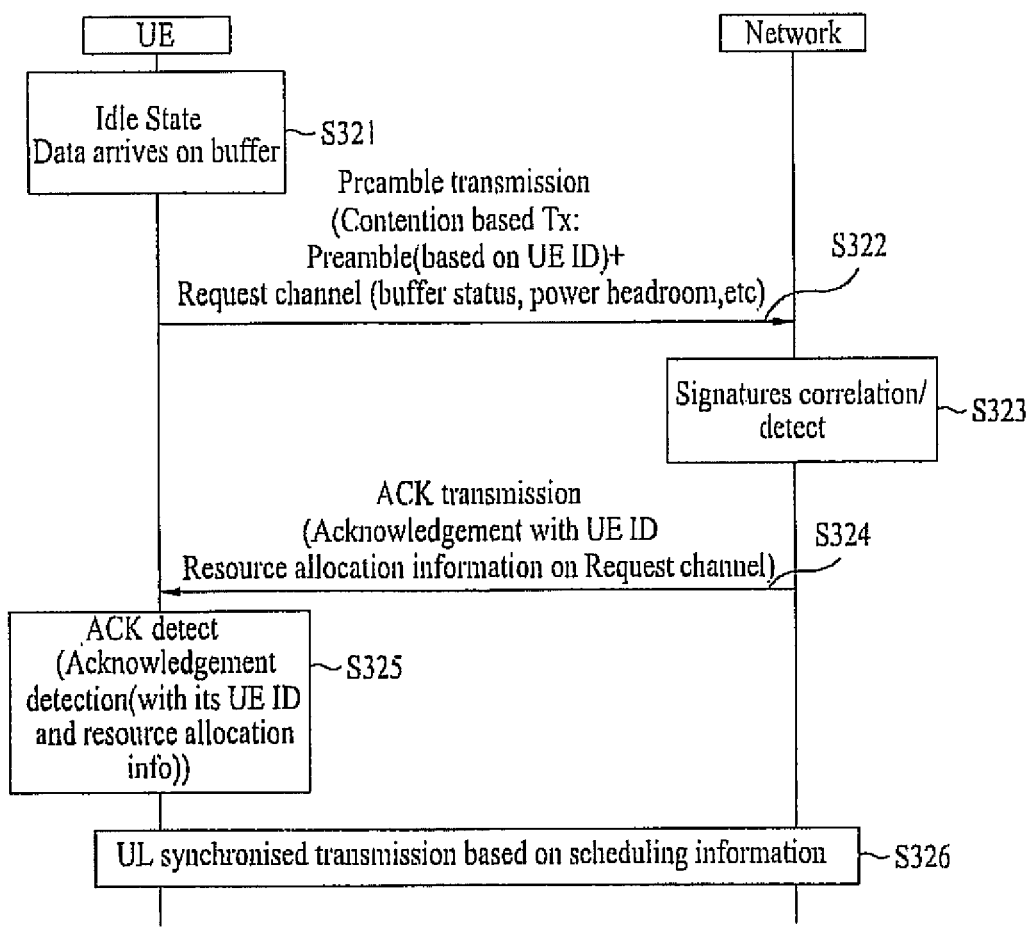
Figure 3C:
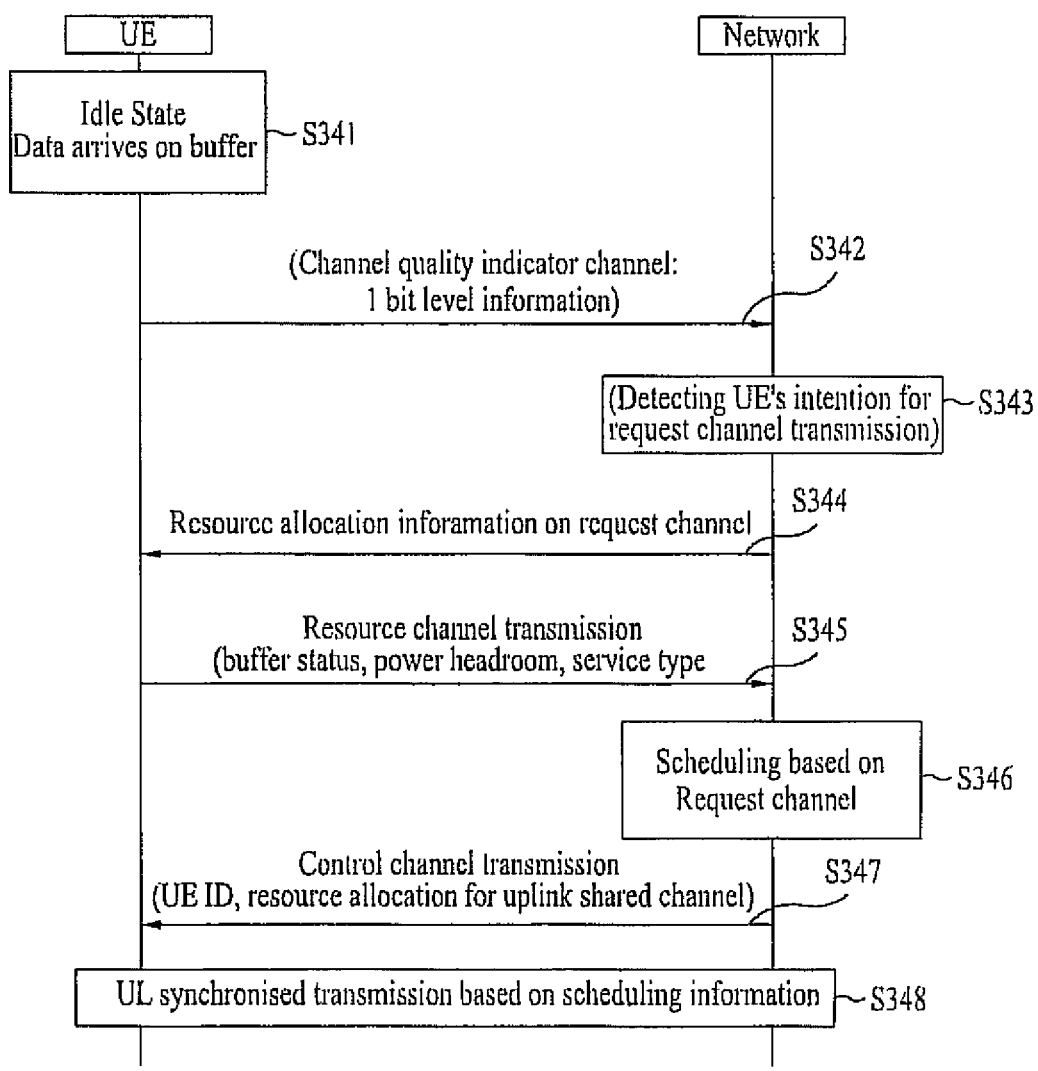

FIGS. 3A to 3C are flowcharts of a method of transmitting a signaling message according to one embodiment of the present invention.

Referring to FIG. 3A, a user equipment transmits a preamble according to the first embodiment, receives scheduling information transmitted together with an ACK message for the preamble, and then transmits a signaling message according to the received scheduling information.

In particular, a user equipment is in a state that a UE ID (user equipment identifier) is given to the user equipment and in an idle mode that data is not currently transmitted. If data to be transmitted by the user equipment is generated, the data to be transmitted needs to be stored in a buffer of the user equipment (S301). In this case, the user equipment generates a preamble sequence based on its UE ID according to the contention based transmission method and then transmits the generated preamble sequence to a Node B (S302).

A mobile communication system including the Node B receives the preamble and then understands that the preamble is received from a specific user equipment (S303). Namely, the mobile communication system detects a signature due to the UE ID.

Once the preamble is recognized, An ACK signal for the preamble is transmitted (S304). In the ACK signal, information for the UE ID is included. So, the danger of data collision can be eliminated. And, resource allocation information for a random request channel is transmitted together with the ACK signal. The request channel is established to deliver a signaling message that will be sent to the user equipment. In particular, the user equipment transmits the signaling message via the request channel. So, the resource allocation information for the request channel is transmitted together with the ACK signal.

The user equipment receives the ACK signal and the resource allocation information for the request channel (S305).

The user equipment attempts a transmission of the signaling message via the request channel using the resource allocation information (S306). In the example shown in FIG. 3A, the signaling message is the aforesaid request message.

The request message may include buffer status information indicating a status of a buffer of the user equipment. And, the request message may include power headroom information indicating a relation between a maximum transmission power of the user equipment and a current transmission power. The mobile communication system is able to estimate a distance between the user equipment and the Node B and decide a data transmission rate applicable to the user equipment. The request message may include service type information indicating a type of the data the user equipment attempts to transmit. In this case, the service type information may include information for whether the data to be transmitted needs a real-time transmission, etc.

The mobile communication system receives the signaling message, i.e. the request message and then performs scheduling for the data to be transmitted according to the request message (S307).

A result of the scheduling according to the signaling message, i.e., the request message can be transmitted via a random control channel (s308). The result of the scheduling relates to information for radio resources allocated for the data to be transmitted. And, the data to be transmitted is transmitted on an uplink shared channel. The result of the scheduling transmitted according to the scheduling step S307 includes UE ID information to identify the user equipment within the shared channel. And, the result of the scheduling includes information for the resource allocation to the shared channel.

According to the result of the scheduling, the user equipment transmits the data to the mobile communication system (S309).

Referring to FIG. 3B, the user equipment transmits the signaling message together with the preamble according to the first embodiment of the present invention.

In particular, the UE ID has given to the user equipment and the user equipment is in an idle mode.

If data to be transmitted by the user equipment is generated, the data to be transmitted needs to be stored in a buffer of the user equipment (S321). In this case, the user equipment generates a preamble sequence based on its UE ID according to the contention based transmission method and then transmits the generated preamble sequence to a Node B (S322).

A signaling message making a request for channel assignment for the data to be transmitted is transmitted together with the preamble. The signaling message may include buffer status information indicating a status of a buffer of the user equipment. And, the signaling message may include power headroom information indicating a relation between a maximum transmission power of the user equipment and a current transmission power. The mobile communication system is able to estimate a distance between the user equipment and the Node B and decide a data transmission rate applicable to the user equipment. The signaling message may include service type information indicating a type of the data the user equipment attempts to transmit. In this case, the service type information may include information for whether the data to be transmitted needs a real-time transmission, etc.

The mobile communication system receives the signaling message and the preamble and detects that the signal is received from the user equipment (S323). And, the mobile communication system performs scheduling for the data to be transmitted according to the signaling message. According to a result of the scheduling, an ACK signal for the preamble and resource allocation information according to the result of the scheduling are transmitted (S324). The ACK signal includes information for the UE ID to prevent the data collision problem. The result of the scheduling relates to information for radio resources allocated for the data to be transmitted. And, the data to be transmitted is transmitted on an uplink shared channel. The result of the scheduling includes UE ID information to identify the user equipment within the shared channel. And, the result of the scheduling includes information for the resource allocation to the uplink shared channel.

The user equipment receives the ACK message and the resource allocation information according to the step S324 to recognize that the message is for the user equipment itself.

According to the result of the scheduling, the user equipment transmits the data to the mobile communication system (S326).

Referring to FIG. 3C, a process for informing a mobile communication system including a Node B that there exists a request message to be transmitted using a 1-bit level signal added to the CQICH and allocating uplink resources for a transmission of the request message is explained.

In particular, if data to be transmitted by a user equipment is generated, the data to be transmitted needs to be stored in a buffer of the user equipment (S341). In this case, the user equipment transmits 1-bit additional information via CQICH (S342). The additional 1-bit indicates a presence or non-presence of a signaling message the user equipment attempts to transmit.

The mobile communication system including the Node B detects the 1-bit additional information transmitted on CQICH (S343). If it is detected via the 1-bit additional information that there exists the signaling message the user equipment attempts to transmit the mobile communication system allocates resources via a random request channel. Namely, the mobile communication system orders the user equipment to transmit the signaling message on the request channel.

The mobile communication system transmits resource allocation information on the request channel for a transmission of the signaling message (S344). The resource allocation information preferably contains a UE ID. This is because the user equipment needs to be identified if the resource allocation information is transmitted on a shared channel.

The user equipment attempts the transmission of the signaling message via the request channel using the resource allocation information (S345). In the example shown in FIG. 3C, the signaling message is the aforesaid request message.

The request message may include buffer status information indicating a status of a buffer of the user equipment. And, the request message may include power headroom information indicating a relation between a maximum transmission power of the user equipment and a current transmission power. The request message may include service type information indicating a type of the data the user equipment attempts to transmit.

The mobile communication system receives the signaling message, i.e. the request message and then performs scheduling for the data to be transmitted according to the request message (S346).

A result of the scheduling according to the signaling message, i.e., the request message can be transmitted via a random control channel (S347). The result of the scheduling relates to information for radio resources allocated for the data to be transmitted. And, the data to be transmitted is transmitted on an uplink shared channel. The result of the scheduling includes UE ID information to identify the user equipment within the shared channel. And, the result of the scheduling includes information for the resource allocation to the shared channel.

According to the result of the scheduling, the user equipment transmits the data to the mobile communication system (S348).

Accordingly, the present invention provides the following effects or advantages.

First of all, the present invention proposes a method of transmitting a signaling message efficiently in case that a user equipment, which is in an idle mode in uplink of a system transmitting data using a plurality of subcarriers, transmits an urgent or normal signaling message. Hence, if a contention based mode is enhanced by the method according to the present invention, it is able to lower a probability of data collision.

Secondly, if a scheduled mode is enhanced by the method according to the present invention, it is able to guarantee that a signaling message can be transmitted to user equipments within a prescribed time delay.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing buffer status information by a user equipment in a mobile communication system communicating via a plurality of orthogonal subcarriers, the method comprising:

transmitting a signal of one bit information to a base station via a specific dedicated physical uplink channel while the user equipment is uplink time aligned and when the buffer status information needs to be transmitted, wherein the signal is used for informing a presence of a request for uplink shared channel resources;

receiving first resource allocation information for an uplink shared channel from the base station after transmitting the signal; and transmitting the buffer status information to the base station through the uplink shared channel using the first resource allocation information.

2. The method of claim 1, further comprising receiving second resource allocation information for the uplink shared channel from the base station after transmitting the buffer status information.

3. A method of obtaining buffer status information by a base station in a mobile communication system communicating via a plurality of orthogonal subcarriers, the method comprising:

receiving a signal of one bit information from a user equipment via a specific dedicated physical uplink channel while the user equipment is uplink time aligned, wherein the signal is used for informing a presence of a request for uplink shared channel resources;

transmitting first resource allocation information for an uplink shared channel to the user equipment after receiving the signal; and receiving the buffer status information from the user equipment through the uplink shared channel using the first resource allocation information.

4. The method of claim 2, wherein the first and second resource allocation information is received using an identifier of the user equipment.

5. The method of claim 1, wherein power headroom information is transmitted to the base station along with the buffer status information.

6. The method of claim 3, further comprising transmitting second resource allocation information for the uplink shared channel to the user equipment after receiving the buffer status information.

7. A user equipment in a wireless communication system, the user equipment comprising:

a transmitter/receiver configured to transmit or receive a signal to or from a base station using a plurality of orthogonal subcarriers; and a processor connected to the transmitter/receiver and configured to control the transmitter/receiver for providing buffer status information comprises:

transmitting a signal of one bit information to the base station via a specific dedicated physical uplink channel while the user equipment is uplink time aligned and when the buffer status information needs to be transmitted, wherein the signal is used for informing a presence of a request for uplink shared channel resources;

receiving first resource allocation information for an uplink shared channel from the base station after the transmission of the signal; and transmitting the buffer status information to the base station through the uplink shared channel using the first resource allocation information.

8. The user equipment of claim 7, wherein providing the buffer status information further comprises receiving second resource allocation information for the uplink shared channel from the base station after transmitting the buffer status information.

9. The user equipment of claim 8, wherein the first and second resource allocation information is received using an identifier of the user equipment.

10. The user equipment of claim 7, wherein power headroom information is transmitted to the base station along with the buffer status information.

11. A base station in a wireless communication system, the base station comprising:
a transmitter/receiver configured to transmit or receive a signal to or from a user equipment using a plurality of orthogonal subcarriers; and
a processor connected to the transmitter/receiver and configured to control the transmitter/receiver for obtaining buffer status information, wherein obtaining the buffer status information comprises:

receiving a signal of one bit information from the user equipment via a specific dedicated physical uplink channel while the user equipment is uplink time aligned, wherein the signal is used for informing a presence of a request for uplink shared channel resources;

transmitting first resource allocation information for an uplink shared channel to the user equipment after receiving the signal; and receiving buffer status information from the user equipment through the uplink shared channel using the first resource allocation information.

12. The base station of claim 11, wherein obtaining the buffer status information further comprises transmitting second resource allocation information for the uplink shared channel to the user equipment after receiving the buffer status information.

* * * * *